United States Patent
Alberth, Jr. et al.

(10) Patent No.: US 8,954,501 B2
(45) Date of Patent: Feb. 10, 2015

(54) DEVICES AND METHODS FOR DETERMINING A GROUP AND FOR DETERMINING INFORMATION RELATED TO GROUP ENTRIES

(75) Inventors: William P. Alberth, Jr., Prairie Grove, IL (US); Steve R. Bunch, Harvard, IL (US); Gary W. Grube, Barrington, IL (US); Michael A. Newell, Williams Bay, WI (US); Robert J. O'Dea, Fort Lauderdale, FL (US); William L. Olson, Palatine, IL (US); Frederick W. Vook, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 419 days.

(21) Appl. No.: 12/145,732

(22) Filed: Jun. 25, 2008

(65) Prior Publication Data

US 2009/0327415 A1    Dec. 31, 2009

(51) Int. Cl.
*G06F 15/16* (2006.01)
*H04M 1/2745* (2006.01)
*H04M 1/725* (2006.01)

(52) U.S. Cl.
CPC ...... *H04M 1/2745* (2013.01); *H04M 1/274583* (2013.01); *H04M 1/274508* (2013.01); *H04M 1/72566* (2013.01); *H04M 1/72572* (2013.01); *H04M 2250/60* (2013.01); *H04M 2250/62* (2013.01)
USPC ........... 709/204; 370/260; 370/259; 370/261; 370/262

(58) Field of Classification Search
USPC ....................................... 709/204
See application file for complete search history.

(56) References Cited

U.S. PATENT DOCUMENTS

| | | | |
|---|---|---|---|
| 7,142,839 B2 * | 11/2006 | Pelaez et al. | 455/404.1 |
| 7,295,852 B1 | 11/2007 | Davis et al. | |
| 7,574,473 B2 * | 8/2009 | Surazski | 709/204 |
| 7,679,518 B1 * | 3/2010 | Pabla et al. | 340/573.1 |
| 7,707,256 B2 * | 4/2010 | Rollin et al. | 709/206 |
| 7,844,034 B1 * | 11/2010 | Oh et al. | 379/45 |
| 2002/0078153 A1 * | 6/2002 | Chung et al. | 709/204 |
| 2003/0119540 A1 | 6/2003 | Mathis | |
| 2003/0153364 A1 * | 8/2003 | Osann, Jr. | 455/567 |

(Continued)

FOREIGN PATENT DOCUMENTS

EP    1478134 A1    11/2004

OTHER PUBLICATIONS

PCT/US2009/045781; PCT Search Report and Written Opinion; Aug. 3, 2009.

*Primary Examiner* — Andrew Goldberg
(74) *Attorney, Agent, or Firm* — IP Spring (57) ABSTRACT

Described are methods and devices for identifying a group that include various methods to determine a group. Also described are devices and methods for attempting communication with a missing member of the group include different manners in which to determine information related to an entry of a group. The described devices and methods may be particularly beneficial at the particular time the certain group members plan to be or are in communication with one another. In this way, in the event that two or more entries of a group planned to be in communication or are in communication in-real time, in accordance with the disclosed devices and methods, the parties may be able to bring one or more other entries of the group into the communication as needed or desired.

13 Claims, 4 Drawing Sheets

(56) References Cited

U.S. PATENT DOCUMENTS

| | | | |
|---|---|---|---|
| 2003/0158900 A1* | 8/2003 | Santos | 709/205 |
| 2004/0203977 A1* | 10/2004 | Kennedy | 455/518 |
| 2004/0246332 A1* | 12/2004 | Crouch | 348/14.08 |
| 2004/0267595 A1* | 12/2004 | Woodings et al. | 705/9 |
| 2005/0027716 A1* | 2/2005 | Apfel | 707/100 |
| 2005/0034079 A1* | 2/2005 | Gunasekar et al. | 715/753 |
| 2005/0071237 A1* | 3/2005 | Caspi et al. | 705/25 |
| 2005/0094794 A1* | 5/2005 | Creamer et al. | 379/202.01 |
| 2005/0221821 A1 | 10/2005 | Sokola et al. | |
| 2005/0222752 A1 | 10/2005 | Sokola et al. | |
| 2005/0227676 A1 | 10/2005 | De Vries | |
| 2006/0239212 A1* | 10/2006 | Pirzada et al. | 370/260 |
| 2006/0252442 A1 | 11/2006 | Nurmi | |
| 2007/0011273 A1* | 1/2007 | Greenstein et al. | 709/217 |
| 2007/0021137 A1 | 1/2007 | Kokkonen et al. | |
| 2008/0046512 A1* | 2/2008 | Jones et al. | 709/204 |
| 2008/0076418 A1 | 3/2008 | Beyer, Jr. | |
| 2008/0080679 A1* | 4/2008 | Fernandez et al. | 379/88.17 |
| 2008/0120381 A1* | 5/2008 | Awan et al. | 709/206 |
| 2008/0159511 A1* | 7/2008 | Keohane et al. | 379/202.01 |
| 2008/0235287 A1* | 9/2008 | Bocking et al. | 707/104.1 |
| 2009/0319916 A1* | 12/2009 | Gudipaty et al. | 715/753 |
| 2009/0323916 A1* | 12/2009 | O'Sullivan et al. | 379/202.01 |

* cited by examiner

DEVICES AND METHODS FOR DETERMINING A GROUP AND FOR DETERMINING INFORMATION RELATED TO GROUP ENTRIES

FIELD

Disclosed are devices and methods for determining a group and for determining information related to entries of the group, and in particular methods and group-forming and information-gathering enabled-devices that can provide, among other results, a proximity or location of the device of an entry in advance of communication or during real-time communication.

BACKGROUND

Various terms are applied to groups of people to categorize their relationships with one another. For example, "peer groups," "tribes" and "affinity groups" are terms that are commonly used to describe groups of people that are in some way connected with one another. For communication by communication devices, users often keep contact lists, for example, in the form of telephone books stored on the communication devices. A group of particular contacts that may be stored in the telephone book memory of a communication device may be categorized in different ways. For example, particular contact entries of a database may be grouped together to form peer groups, tribes or affinity groups manually by a user of the communication device.

When two or more members of a particular group plan to be in communication or are currently in communication with one another, there may be a desire to include other members of that particular group in the communication, for example, in a conference call. Coordinating communication between some, many, most or all members of a group may be difficult. There may be a need to learn the manner in which to contact a member of the group in the future or immediately. Typically, if the other members are engaged in communication via a conference call, they may attempt to contact other members via the communication address stored in the telephone book of the device. However, the member they may be trying to contact may have their communication device turned off, or may be engaged in conversation on the device. Hence, there may be no other manner in which to contact the member of the group at that particular time.

An example of members of a group that may need immediate access to other members may be a quorum of executives of a company that is required for decision making. In the event that a quorum is required to make a decision, and not all members of that group could be contacted, for example, immediately, a difficult situation may present itself. Members of other types of groups, such as those in medicine, public service and law practices may need to make immediate contact with other group members in the event of critical situations.

DETAILED DESCRIPTION

It would be beneficial if groups of contacts or entries in a database were associated with one another by various methods. Also, it would be beneficial if there were different manners in which to determine information related to an entry of a group, particularly at the particular time the other group members plan to be in communication or in real-time are in communication with one another. In the event that two or more entries of a group planned to be in communication or are in communication in-real time, it would be beneficial to be able to bring one or more other entries of the group into the communication.

Disclosed are methods and devices for identifying a group and attempting communication with a missing member of the group. In one embodiment, a method may include determining a group of entries in a database, the group of entries being a division, class, or distinct portion of the entries of the database as a whole, and each of the entries of the group is correlated to a communication address. Moreover, in attempting to determine information related to one entry of the one group, it may be possible to learn in the future or in the present how to contact an entry of the group. For example, information such as the proximity or location of a member of a group would be beneficial to obtain so that an entry of a group could be contacted either by a communication address of a communication device, or in another way, such as by paging, or by contacting a person close in proximity to the entry of the group.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
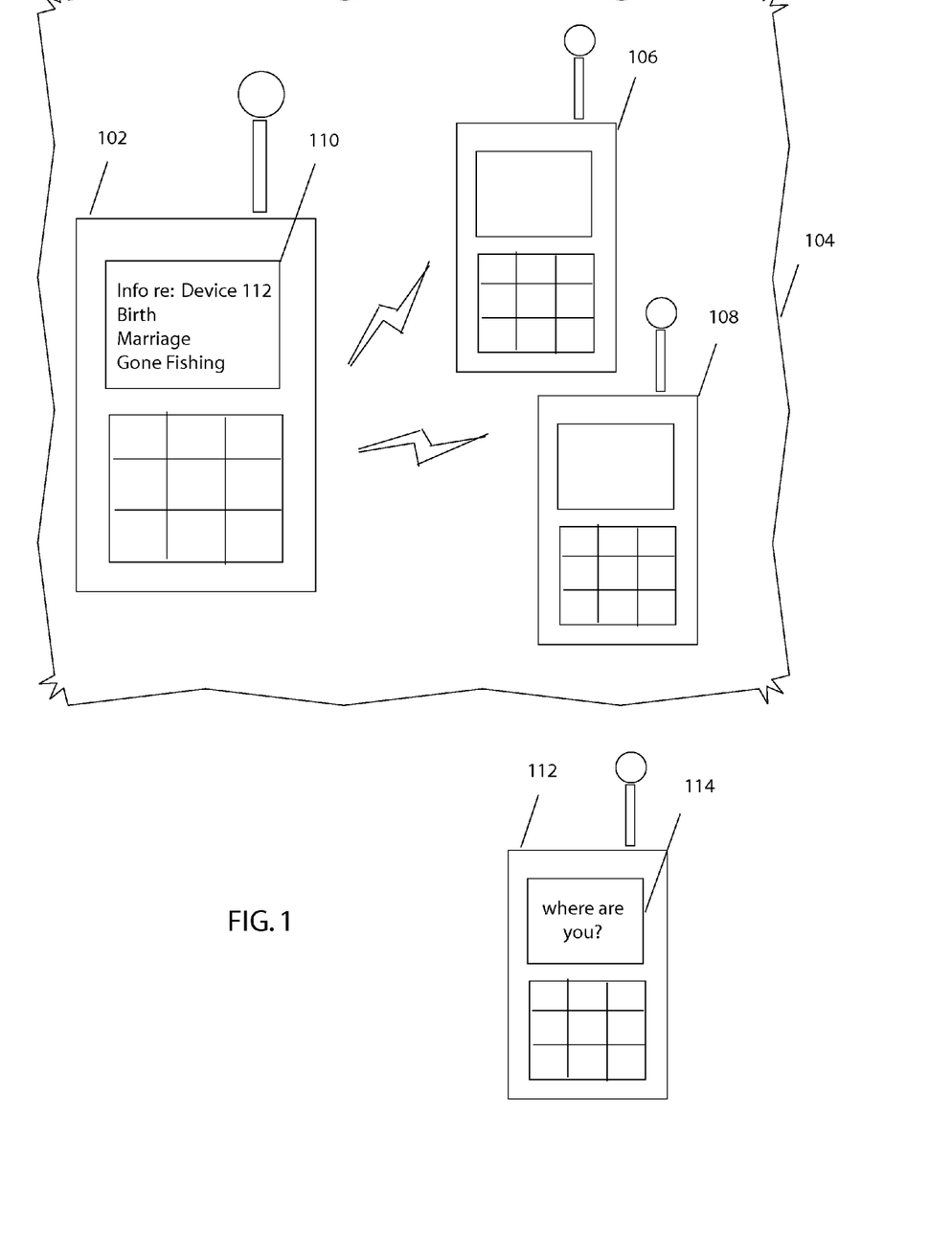
FIG. 1 depicts a plurality of communication devices, three of which are in three-way communication, a fourth of which is not in communication with the other three.

FIG. 1 depicts a plurality of communication devices, three of which are in three-way communication, a fourth of which is not in communication with the other three. The depicted plurality of communication devices 102, 106, 108 and 112 may be a group of entries in a database, the group of entries being a division, class, or distinct portion of the entries of the database as a whole, wherein each entry of the group is correlated to a communication address. As will be discussed in detail below, there are different manners in which to determine a group of entries of a database.

Communication device 102 is depicted as the moderator of the three-way communication 104 with communication device 106 and communication device 108. Device 112 is not a participant in the call. The communication device 112 exhibits on its display device 114, "where are you?" as a question that may be posed by one or more of the communication devices 102, 106 or 108. The communication device 102 exhibits on its display 110 information regarding an entry of the group associated with communication device 112 that is not in real-time participating in the three-way communication. Particularly while the other group members plan to be or are in communication 104 with one another, it may be possible to learn a future or a present manner in which to contact an entry of the group such as device 112 to establish future or immediate communication with that entry. Information about a member associated with device 112 may be gathered, and may be exhibited on the display 110 of device 102. For example the information displayed may indicate "a birth," "a marriage," or other information obtained about the person, or a location or proximity that is indicated by a "gone fishing" reference. Such information may be annunciated in any manner, such as audibly, or visually, or for example, a combination of both. Determining information such as that depicted on the display 110 of device 102 may be attempted in accordance with different manners as described below.

A communication device, for example, device 102 may be any type of communication device, wired or wireless. For example, the mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, access to search engines, multimedia content access and/or voice over internet protocol (VoIP). Any type of wired communication device is also within the scope of this discussion.

Figure 2:
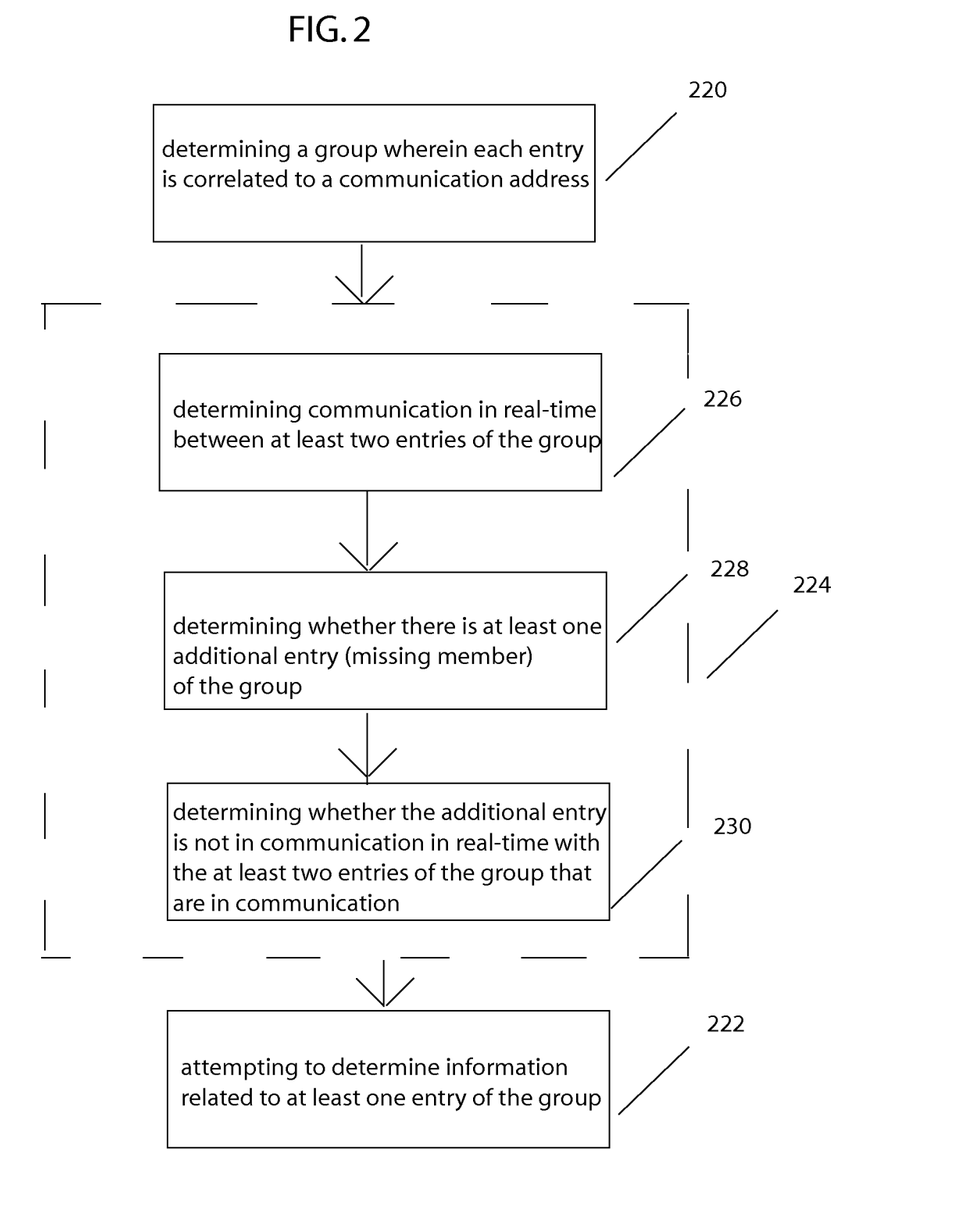
FIG. 2 is a flow chart including steps of determining a group and attempting to determine information related to at least one entry of the group.

FIG. 2 is a flow chart including steps of determining a group 220 and attempting to determine information 222 related to at least one entry of the group. The group of entries as mentioned above, are a division, class, or distinct portion of the entries of the database as a whole, wherein each of entries of the group is correlated to a communication address. For example, the entries may be those of a telephone book database of a communication device. The entries may include a communication address that, for example, may be a contact's telephone number.

Also as mentioned, determining information 222 related to at least one entry of the group such as the proximity or location of a member of a group may be beneficial to obtain. In this way an entry of a group could be contacted either by a communication address of a communication device, or in another way, such as by paging, or contacting a person close in proximity to the entry of the group. Accordingly, even if the entry's communication device were turned off or engaged, determining the proximity or location of the entry, may provide a manner in which to contact the entry and arrange to bring the entry into the communication either in the future or at the present time. The group may be determined 220 in different manners as is discussed below. Also, attempting to determine information 222 related to one entry of the group may be determined in different manners as is discussed below.

FIG. 2 further depicts a plurality of steps 224 that illustrate an embodiment of a real-time process. In the case where communication is determined 226 in real-time between at least two entries of one group, the group members associated with the entries may wish to engage a missing group member. That is, there may be a determination 228 whether there is at least one additional entry of the one group of entries that, for example, the two entries wish to engage. A determination 230 that the missing entry is not in communication in real-time with the two entries of the group may provide a motivation to attempt to determine information 222. Where the communication is not in real-time, but may be planned, via for example, SMS communication, and no response is received from one member of the group, there also may be an attempt 222 to determine information related to at least one entry of the at least one group.

Figure 3:
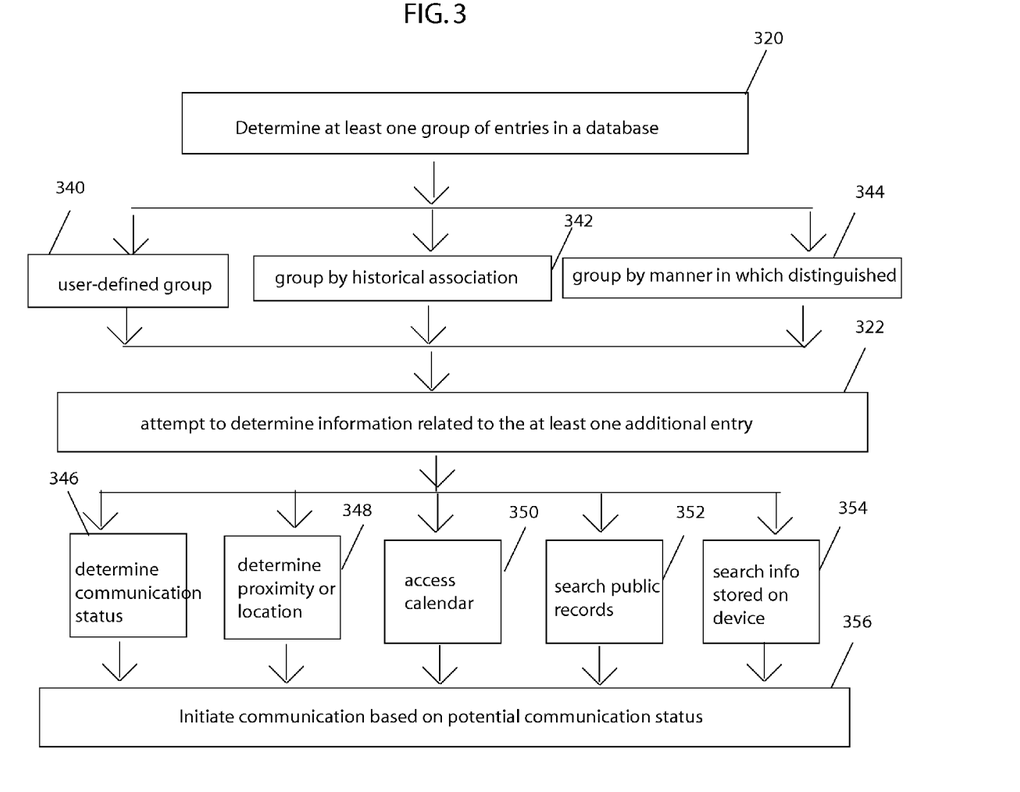
FIG. 3 is a flow chart depicting different manners in which a group may be determined in a database, and different manners in which to attempt to determine information related to an entry of the group.

FIG. 3 is a flow chart depicting different manners in which a group may be determined 320 in a database, and different manners in which to attempt to determine 322 information related to an entry of the group. The flowchart of FIG. 3 further illustrates attempting to determine the potential communication status of, for example, device 112.

As discussed, a group may be determined from a database. In the example described above, the database may be a telephone book of a communication device. It is understood, however, that the database may by any type of database and/or combination of databases that of course may be located on one device and/or a plurality of devices. The group may consist of, for example, siblings, close friends, bowling buddies, play group parents, high school friends and/or business associates.

As mentioned above, particular contact entries of a database may be grouped together to form peer groups, tribes or affinity groups, for example, manually by a user of the communication device. In one embodiment, determining 320 at least one group of entries in a database that is a division, class, or distinct portion of the entries of the database as a whole includes defining by a user 340 at least one group of entries. In another embodiment determining 320 at least one group of entries in a database includes determining by historical association 342 of at least one group of entries. The historical association may be determined 342 by communication records of the device, or may be imported to the device from another device. Historical associations may be determined 342 from any source, for example, received SMS messages, Instant Messaging (IM), video telephony (VT), Internet browsing and/or communication address commonality. Moreover, historical association may be determined from the proximity of devices. For example, proximity may be detected when the devices may be with Bluetooth range. In still another embodiment, determining at least one group of entries in accordance with a particular manner in which a distinction originated 344. For example, there may be an indication that the device 102 receives communication from other devices, for example, device 106 and 108 that identify device 102 as a member of a group associated with the other devices 106 and 108. In this way, a group identified and stored in device 102 may be formed by distinction 344 in an entry of the device 102. In another example, a device may keep a log of descriptions of communications which can be distinguished 344 from one another. A user may manually map them into groups, along with any other distinguishing characteristics, and/or the descriptions may be automatically mapped into groups.

By way of example a user could manually define a group by entering a group name into the address book entries for all members of a group. Audrey has several friends that go out to dinner once a week. Audrey could enter "dinner" in the address book entries for all of these friends. Audrey's device may also track who Audrey is with over time. The device can note that Audrey tends to eat dinner at different restaurants with a small number of people and may automatically establish a group, eliminating the need for Audrey to manually configure the group. The address book entries may also include interests of the individuals. The interests may be entered by Audrey or provided by her friends (for example by sharing a Vcard as is known in the art). The device can note that several individuals have "restaurants" as an interest and can form a group.

As well, there is a plurality of different manners in which to attempt to determine information 322 related to an entry of the group. The examples discussed above describe members of a group planning to communicate, or communicating in real-time and then attempting to determine information 322 related to an entry of the group. However, the step of attempting to determine information 322 may occur at any time. That is, determining a group 320 may occur at any time as well as attempting to determine information 322 may occur at any time. Moreover, determining a group 320 may be a dynamic process. That is, groups may be initiated, and grow and/or contract depending, for example, on the particular manner in which a distinction originated. For example, a group may be determined related to an upcoming sports event. When the event passes, that particular group may be deleted.

The step of determining information 322 related to at least one entry of the at least one group by determining the status of a communication device 346 correlated to one additional entry may be used independently, or in combination with other methods described below. The status of the communication device 112 (see FIG. 1) of a missing member of a group, for example, may be that it is turned off, engaged, out of a reception area, which may help determine proximity. Particularly if the status of the communication device 112 is not apparent, determining proximity 348 via different methods may help bring the device 112 into a future or present communication device 102. For example, reviewing other communication with device 112 may provide proximity or location information. Data stored on device 102, such as SMS communication may be accessed to determine if proximity or location at a particular time were mentioned. Data stored in a device other than device 102, such as a PC or server including, for example, stored email may be accessed to determine if proximity or location at a particular time were mentioned. Public information such as that provided via the Internet may also be accessed to determine if proximity or location at a particular time were mentioned. If the status of the communication device 112 is not determined 346, but a proximity or location may be determined 348, the user of device 112 may be contacted via another communication address such as a landline. If the location is known, the user of device may be contact by paging or by contacting a person close within close proximity of the user.

The step of device 102 (see FIG. 1) determining information 322 related to at least one entry of a group by determining by accessing a calendar 350 correlated to one additional entry such as that of device 112 may be used independently, or in combination with other described methods. Permission to access a calendar may be given by the user of device 112 to the user of device 102. Or in the alternative, a company calendar may provide access to the schedule of the user of device 112. Also, a request to access a calendar 350 stored on device 112 may be granted to device 102. In this way, the future or present availability of device 112 to engage in communication with the group of devices 102, 106 and 108 may be determined.

Already mentioned is attempting to determine 322 information related to one entry of the group by searching public information 352 correlated to the at least one entry. Public information may be accessed on the Internet by a web browser-enabled device 102 (see FIG. 1), or may be accessed via another device, such as a PC or server. Information such as the birth of a baby, a death in the family, a car accident may be learned by searching public records. Such information may drive starting a communication process such as the conference call 104. Also by searching public information 352, the proximity or location of the user of device 112 may be determined 346. Moreover, by searching public records 352, the schedule of the user of the device 112 may be determined 350.

Also already mentioned is attempting to determine information 322 by searching information stored in a memory of the device. The memory of the device 102 may have, for example, SMS messages stored that may have information in them related to entries of interest. A description of the communication may be extrapolated from the communication so that potentially, for example, the proximity or location of a user of a device 112 may be determined.

As mentioned above, the enumerated steps of determining information 322 related to one entry of one group may be used independently, or in combination with each other. One step may aid in determining information related to another step, such as searching public records 352 may help determined the proximity or location 348 of the user of device 112. It is understood that any combination of steps is within the scope of this discussion, and that the list referring to determining information 322 provided is not an exhaustive list.

If information related to an entry of the group 322 is determined, then it may be possible to initiate communication based on a revealed potential communication status of device 112. Device 102 may provide a prompt 356 a user associated of device 102 and/or devices 106 and 108, to determine whether to initiate communication with the at least one additional entry being device 112 based on the potential communication status and in accordance with a communication address correlated to one additional entry.

Figure 4:
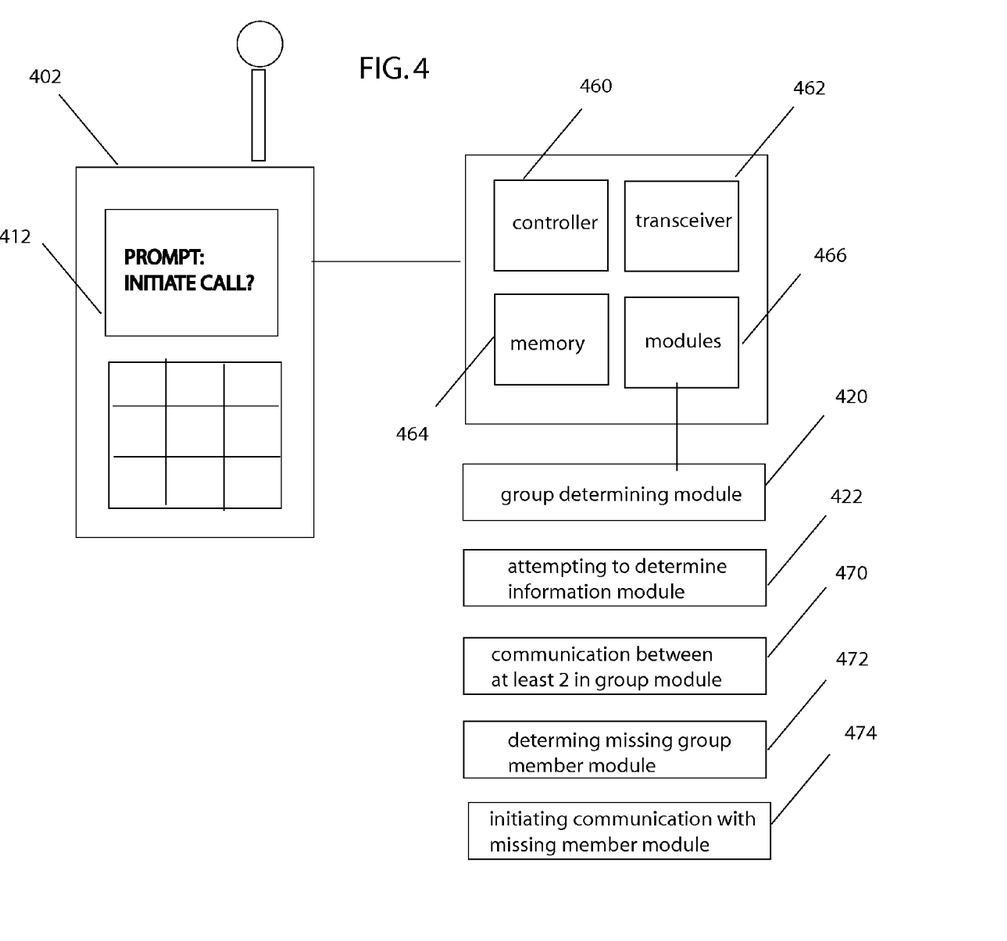
FIG. 4 depicts an embodiment of a group-forming and information-gathering enabled-device mobile communication device including a controller configured to execute instructions and a memory in communication with the controller.

FIG. 4 depicts an embodiment of a group-forming and an information-gathering enabled-device mobile communication device 402 including a controller 460 configured to execute instructions and a memory 464 in communication with the controller. Device 402 may form a group with other devices. In the event that device 402 and another device plan to be in communication or are in communication in-real time, a group-forming and an information-gathering enabled-device such as mobile communication device 402 may be able to bring one or more other entries of the group into the communication.

While depicted as a mobile communication device 402, device 402 may be any type of communication device, wireless or wired. The mobile communication device 402 for example, may be implemented as a cellular telephone (also called a mobile phone). The mobile communication device 402 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The device can include a memory 464 and modules 466. The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. For example, the modules may include a group determining module 420 including instructions stored in the memory and configured to be executed by the controller 460 to determine at least one group of entries in a database that is a division, class, or distinct portion of the entries of the database as a whole, wherein each of the at least one group is correlated to a communication address and is stored in the memory 464. Example operations of a group determining module are depicted in FIG. 3 The modules may also include an attempting module 422 including instructions stored in the memory 464 and configured to be executed by the controller 460 to attempt to determine information related to one entry of the group. Example operations of an attempting module are also depicted in FIG. 3

Additional operations may be performed by a device such as device 402. As mentioned, device 402 may attempt to determine information in planning for communication and/or while engaged in communication, or at any other time. In a real-time use case, for example device 402 may include a communication determining module 470 configured to determine communication in real-time in accordance with respective communication addresses between at least two entries of the one group. Moreover, for example, device 402 may include a missing group member module 472 for determining whether there is at least one additional entry of the group of entries. Also, for example, device 402 may include a communication initiating module 474 for initiating communication in any suitable manner with one or more additional entries.

The above-described methods and devices for identifying a group include various methods to determine a group. The above-described methods and devices for attempting communication with a missing member of the group include different manners in which to determine information related to an entry of a group. The described methods may be particularly beneficial at the particular time the certain group members plan to be or are in communication with one another. In this way, in the event that two or more entries of a group planned to be in communication or are in communication in-real time, in accordance with the disclosed devices and methods, the parties may be able to bring one or more other entries of the group into the communication as needed or desired.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a communication device, the method comprising:
   determining, in a communication device, a group of entries in a database, wherein each entry is correlated to a communication address, the group being determined by historical association via records of at least one group of entries;
   initiating, in a communication device, communication in real-time between at least two entries of the group, wherein the at least two entries include a first participating entry having a first participating communication device and a second participating entry having a second participating communication device;
   determining, in a communication device, that a missing entry of the group is not in communication in real-time with the at least two entries of the group that are in communication in real-time, the missing entry not being invited to participate in the initiated communication; and
   attempting to determine information related to the missing entry by a communication device, by determining a status in real-time of a communication device correlated to the missing entry; and
   in response to the communication device correlated to the missing entry being turned off, contacting an entry of the group that is within a predetermined proximity or location of the missing entry in order to notify the missing entry of the real-time communication between the entries of the group.

2. The method of claim 1, further comprising prompting a user associated with at least one of the at least two entries to determine whether to initiate communication with the missing entry based on the status and in accordance with a communication address correlated to the missing entry.

3. The method of claim 1, further comprising initiating communication with a second missing entry based on its communication status.

4. The method of claim 1, wherein determining a group of entries in a database is defined by a user.

5. The method of claim 1, wherein attempting to determine information related to the missing entry of the group comprises determining the status of a communication device correlated to a second missing entry.

6. The method of claim 1, wherein attempting to determine information related to a missing entry of the group comprises determining the proximity or location of a communication device correlated to the missing entry or a second missing entry.

7. The method of claim 1, wherein attempting to determine information related to a missing entry of the group comprises accessing a calendar correlated to at least one missing entry.

8. The method of claim 1, further comprising searching information correlated to at least one missing entry stored in a memory of the device.

9. A method of a communication device, the method comprising:
- determining, in a communication device, a group of entries in a database, wherein each entry is correlated to a communication address, the group being determined by historical association via records of at least one group of entries;
- initiating, in a communication device, communication in real-time between at least two entries of the group, wherein the at least two entries include a first participating entry having a first participating communication device and a second participating entry having a second participating communication device;
- determining, in a communication device, that a missing entry of the group is not in communication in real-time with the at least two entries of the group that are in communication in real-time, the missing entry not being invited to participate in the initiated communication; and
- determining in real-time, by a communication device, a proximity or location of a communication device correlated to the missing entry; and
- in response to the communication device correlated to the missing entry being turned off, contacting an entry of the group that is within the predetermined proximity or location of the missing entry in order to notify the missing entry of the real-time communication between the entries of the group.

10. The method of claim 9, further comprising determining a status of a communication device correlated to the missing entry of the group.

11. A communication device comprising:
- a controller configured to execute instructions;
- a memory in communication with the controller;
- a determining module including instructions stored in the memory and configured to: be executed by the controller to determine a group of entries in a database, wherein each entry is correlated to a communication address and is stored in the memory, the group being determined by historical association via records of at least one group of entries; initiate communication in real-time between at least two entries of the group, wherein the at least two entries include a first participating entry having a first participating communication device and a second participating entry having a second participating communication device; and determine that a missing entry of the group is not in communication in real-time with the at least two entries of the group that are in communication in real-time, the missing entry not being invited to participate in the initiated communication; and
- an attempting module including instructions stored in the memory and configured to be executed by the controller to attempt: to determine information related to a missing entry, by determining a status in real-time of a communication device correlated to the missing entry; and, in response to the communication device correlated to the missing entry being turned off, contact an entry of the group that is within a predetermined proximity or location of the missing entry in order to notify the missing entry of the real-time communication between the entries of the group.

12. The device of claim 11, wherein the information related to the missing entry includes the proximity or location of a communication device associated with the missing entry.

13. The device of claim 11, wherein the information related to the missing entry of the group includes the information obtained from a calendar associated with the missing entry.

* * * * *